US012553593B2

(12) United States Patent
Lin et al.

(10) Patent No.: US 12,553,593 B2
(45) Date of Patent: Feb. 17, 2026

(54) LIGHTING APPARATUS

(71) Applicant: LEEDARSON LIGHTING CO., LTD., Fujian (CN)

(72) Inventors: Wenhao Lin, Fujian (CN); Hongbin Lin, Fujian (CN); Hongkui Jiang, Fujian (CN)

(73) Assignee: LEEDARSON LIGHTING CO.,LTD., Fujian (CN)

( * ) Notice: Subject to any disclaimer, the term of this patent is extended or adjusted under 35 U.S.C. 154(b) by 0 days.

(21) Appl. No.: 18/921,271

(22) Filed: Oct. 21, 2024

(65) Prior Publication Data

US 2025/0129918 A1 Apr. 24, 2025

(30) Foreign Application Priority Data

Oct. 19, 2023 (CN) ......................... 202322806131.6

(51) Int. Cl.

| | |
|---|---|
| ***F21V 19/00*** | (2006.01) |
| ***F21S 4/24*** | (2016.01) |
| ***F21V 3/02*** | (2006.01) |
| ***F21V 7/28*** | (2018.01) |
| ***F21V 14/02*** | (2006.01) |
| ***F21V 23/00*** | (2015.01) |
| ***F21V 23/06*** | (2006.01) |
| *F21Y 115/10* | (2016.01) |

(52) U.S. Cl.

CPC ............ *F21V 19/0015* (2013.01); *F21S 4/24* (2016.01); *F21V 3/02* (2013.01); *F21V 7/28* (2018.02); *F21V 14/02* (2013.01); *F21V 23/003* (2013.01); *F21V 23/06* (2013.01); *F21Y 2115/10* (2016.08)

(58) Field of Classification Search

CPC .......... F21V 19/0015; F21V 7/28; F21V 3/02; F21V 14/02; F21V 23/003; F21V 23/06; F21S 4/24; F21Y 2115/10

See application file for complete search history.

(56) References Cited

U.S. PATENT DOCUMENTS

| | | | | |
|---|---|---|---|---|
| 10,066,791 | B2 * | 9/2018 | Zhang | F21V 3/02 |
| 10,914,428 | B2 * | 2/2021 | Wang | F21V 23/005 |
| 11,209,127 | B2 * | 12/2021 | Jiang | F21K 9/232 |

* cited by examiner

*Primary Examiner* — Bao Q Truong

(74) *Attorney, Agent, or Firm* — LANWAY IPR SERVICES; Chun-Ming Shih

(57) ABSTRACT

A lighting apparatus includes a flexible light strip, a base column, a central column, an extending bracket and a joint part. The flexible light strip is bendable along a longitudinal axis of the flexible light strip to conform to various curvatures. A first end of the extending bracket is fixed on the central column and a second end of the extending bracket engages the flexible light strip to conform to a required varying curvatures of the light strip. The joint part connect the base column and the central column. A thickness of the joint part is larger than ⅔ of a diameter of the central column.

19 Claims, 8 Drawing Sheets

LIGHTING APPARATUS

FIELD

The present invention is related to a lighting apparatus, and more particularly related to a lighting apparatus with easy assembly capability.

BACKGROUND

The history of the light bulb is a fascinating journey that began in the early 19th century. One of the most important milestones in this history was Thomas Edison's invention of the incandescent light bulb in 1879. While Edison is often credited with inventing the light bulb, his work built on earlier discoveries by others, including Humphry Davy and Joseph Swan. The incandescent bulb revolutionized the way people lived by providing a reliable, artificial source of light that could be used at any time of day. This was a significant improvement over the candles and oil lamps that had been used for centuries, offering a cleaner and more efficient way to illuminate homes, streets, and workplaces.

Incandescent bulbs work by passing an electric current through a thin filament, usually made of tungsten, which heats up and emits light. Despite their effectiveness, these bulbs were not very energy efficient, as much of the energy was lost as heat rather than being converted into light. Over time, other types of light bulbs were developed in an effort to improve efficiency and durability. Fluorescent bulbs, which became popular in the mid-20th century, offered a more energy-efficient alternative. They relied on a completely different mechanism, using gases and phosphors to produce light. However, they also had drawbacks, including the use of toxic mercury and a relatively short lifespan.

The development of light-emitting diodes (LEDs) in the latter half of the 20th century marked a major leap forward in lighting technology. Initially used for small indicator lights in electronics, LEDs gradually evolved into a viable option for general illumination. By the early 21st century, LEDs had become an essential part of lighting design due to their superior energy efficiency, longevity, and versatility. Unlike incandescent and fluorescent bulbs, LEDs are solid-state devices that convert electricity directly into light without the need for heat. This allows them to operate with minimal energy waste and a much longer operational lifespan.

The adoption of LED modules in lighting systems has opened up exciting new possibilities for design and functionality. Because LEDs are much smaller than traditional bulbs, they can be arranged in compact and flexible configurations, allowing for sleek and innovative lighting designs. This has revolutionized not only residential lighting but also architectural and commercial applications. LED lighting systems can be integrated into modern buildings and vehicles in ways that were previously unimaginable. Their ability to change color, brightness, and direction with ease has made them a favorite in creative industries such as stage lighting, interior design, and even wearable technology.

One of the most significant advantages of LED technology is its energy efficiency. LEDs use significantly less power than incandescent or fluorescent bulbs, which translates into lower electricity bills and reduced carbon emissions. This has made them an attractive option for governments and companies seeking to meet energy efficiency goals and reduce their environmental footprint. In addition, the long lifespan of LED bulbs-often tens of thousands of hours-means that they need to be replaced far less frequently, further reducing maintenance costs and environmental waste.

LEDs have also spurred innovation in smart lighting systems, which allow users to control their lighting through digital interfaces, including smartphones and voice commands. These systems can adjust brightness based on the time of day, the presence of people in a room, or even the specific needs of different activities. This customization not only enhances comfort and convenience but also maximizes energy savings by ensuring that lights are only used when needed. Furthermore, smart lighting can be integrated into larger home automation systems, contributing to the development of smarter, more sustainable living environments.

As LED technology continues to evolve, we are likely to see even more innovations that enhance human life. Researchers are already exploring new ways to improve the efficiency and brightness of LEDs, as well as to expand their applications. For example, organic LEDs (OLEDs) offer the potential for flexible, transparent, and ultra-thin lighting surfaces that could be embedded in walls, windows, and other unexpected places. Additionally, advances in quantum dot technology are enabling the production of LEDs that emit more natural and customizable light, further blurring the line between artificial and natural illumination.

The importance of illumination in modern life cannot be overstated. From improving safety on roads and in buildings to enhancing productivity in workplaces and providing ambiance in homes, lighting plays a crucial role in virtually every aspect of daily life. With the advent of energy-efficient, customizable, and durable LED lighting, we are witnessing a transformation in the way we think about and use light. This transformation is not just about saving energy—it's about creating environments that are more responsive to human needs and more in tune with sustainable practices.

Looking forward, the future of lighting technology is full of potential. As cities grow and energy demands increase, the need for efficient and innovative lighting solutions will become even more critical. LED technology, with its adaptability and efficiency, is poised to play a central role in meeting these challenges. Whether it's through further reducing energy consumption, enabling new forms of design and architecture, or integrating with cutting-edge smart systems, the evolution of lighting promises to continue shaping the way we live and interact with our world.

SUMMARY

In some embodiments, a lighting apparatus includes a flexible light strip, a base column, a central column, an extending bracket and a joint part.

The flexible light strip is bendable along a longitudinal axis of the flexible light strip to conform to various curvatures.

A first end of the extending bracket is fixed on the central column and a second end of the extending bracket engages the flexible light strip to conform to a required varying curvatures of the light strip.

The joint part connects the base column and the central column.

A thickness of the joint part is larger than ⅔ of a diameter of the central column.

In some embodiments, the central column and the base column are made of glass material.

In some embodiments, the lighting apparatus may also include an Edison cap, a holder, a bulb shell and a driver.

The Edison cap is used for guiding an external AC power to the drive module for generating a driving current to the flexible light strip.

The Edison cap is attached to a bottom end of the holder. The bulb shell is attached to a top end of the holder. The base column is fixed to the top end of the holder.

In some embodiments, the joint part and the base column are integrally molded glass parts, seamlessly fused during a molding process.

In some embodiments, the joint part has a shape of a rectangular prism.

The thickness of the joint part is a length of a shortest side of the rectangular prism.

In some embodiments, the joint part has a socket for inserting a bottom end of the central column.

In some embodiments, the socket is non-circular to prevent rotation.

In some embodiments, the socket is filled with elastic glue for providing a connection buffer between the bottom end of the central column and the joint part.

In some embodiments, a thermal adhesive glue is applied to the socket.

The thermal adhesive glue has a thermal conductivity between 0.8 W/m-K to 5 W/m-K.

In some embodiments, the joint part has asymmetric ridges at a connection portion between the central column and the joint part.

In some embodiments, the extending bracket includes multiple metal support rods.

An inner end of the support rod is embedded in the central column.

An external end of the support rod holds a portion of the flexible light strip.

In some embodiments, a diameter of the central column is smaller than ⅕ of the thickness of the joint part.

In some embodiments, the lighting apparatus may also include a plurality of conductive terminals spaced apart from each other.

The number of the conductive terminals matches the number of the flexible light strips.

A bottom end of each conductive terminal passes through the base column for an electrical connection of an Edison cap.

A top end of each conductive terminal is coupled to the flexible light strip.

In some embodiments, the distance between the top ends of two adjacent conductive terminals is greater than 0.4 mm.

In some embodiments, the top end of each conductive terminal is provided with a bent connecting portion.

The length direction of each bent connecting portion is arranged parallel to an axis of a support rod of the extending bracket, and the lengths of the plurality of bent connecting portions either sequentially increase or sequentially decrease along the axis of the support rod.

In some embodiments, the central column is a multi-stage rotational structure.

The multi-stage rotational structure is capable of rotating along an axis of the central column to expand and deploy the flexible light strip.

In some embodiments, a lock unit locks a status of the multi-stage rotational structure when the multi-stage rotational structure is rooted to a predetermined position.

In some embodiments, a reflective layer is disposed on the surface of the central column.

In some embodiments, a light source is disposed to the central column.

In some embodiments, there are multiple LED modules disposed on the flexible light strip.

The LED modules on the flexible light strip near the base column are more sparsely arranged.

DETAILED DESCRIPTION

Figure 5:
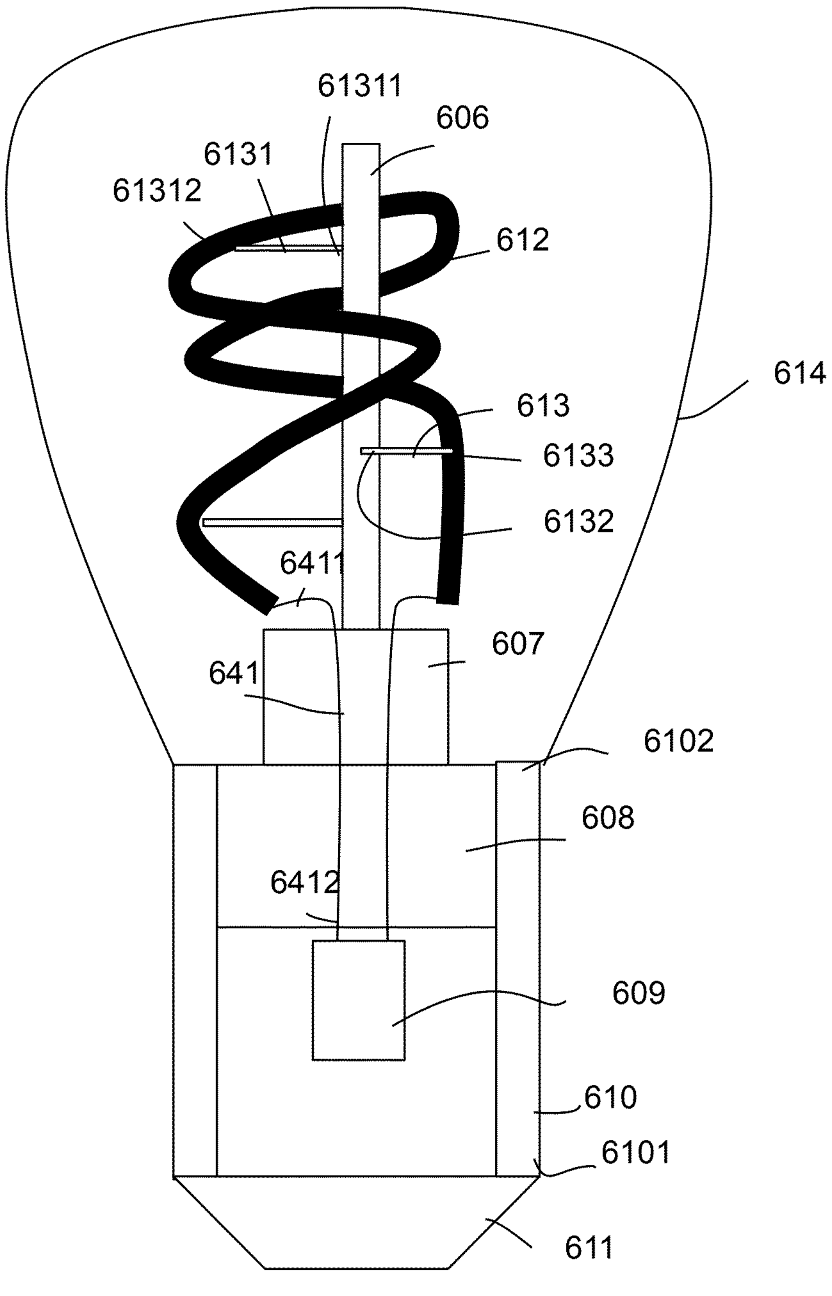
FIG. 5 shows another lighting apparatus embodiment.

In FIG. 5, a lighting apparatus includes a flexible light strip 612, a base column 608, a central column 606, an extending bracket 613 and a joint part 607. The extending bracket 613 may have multiple support rods 6131.

The flexible light strip 612 is bendable along a longitudinal axis of the flexible light strip to conform to various curvatures. From FIG. 5, the light strip is illustrated with an elongated shape, and it has an axis along the elongated direction.

A first end 6132 of the extending bracket 613 is fixed on the central column 606 and a second end 6133 of the extending bracket 613 engages the flexible light strip 612 to conform to a required varying curvatures of the flexible light strip 612.

The joint part 607 connects the base column 608 and the central column 606.

A thickness of the joint part is larger than ⅔ of a diameter 604 of the central column 602.

Figure 6:
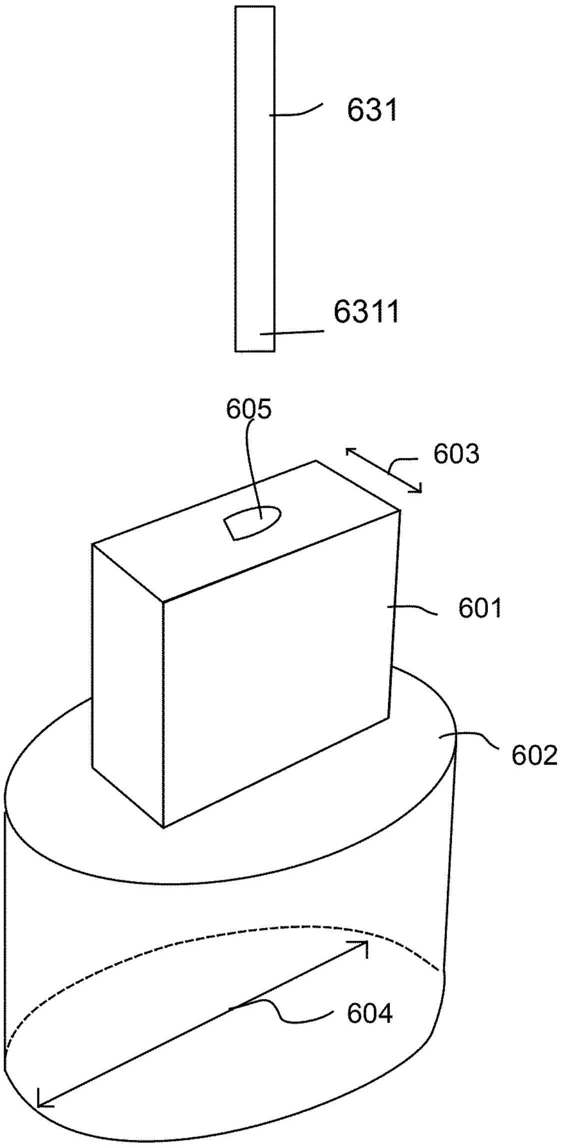
FIG. 6 shows a diameter ratio example.

FIG. 6 shows such example. The joint part 601 has one shortest edge that has a thickness 603. It has a shape of rectangular prism. Please note the rectangular prism here does not have be a perfect geometry rectangular prism, but a similar three-dimension shape is also covered in as rectangular prism here. Please note that the central column in this application does not have to be a perfect circular cylinder. Similar shape may also be covered and the diameter may be a maximum length of occupied on the surface connected to the joint part.

In some embodiments, the central column 601 and the base column 602 are made of glass material.

In FIG. 5, the lighting apparatus may also include an Edison cap 611, a holder 610, a bulb shell 614 and a driver 609.

The Edison cap 611 is used for guiding an external AC power to the drive 609 for generating a driving current to the flexible light strip 612.

The Edison cap 611 is attached to a bottom end 6101 of the holder 610. The bulb shell 614 is attached to a top end 6102 of the holder 610. The base column 608 is fixed to the top end 6012 of the holder 610.

In some embodiments, the joint part and the base column are integrally molded glass parts, seamlessly fused during a molding process.

In some embodiments, the joint part has a shape of a rectangular prism.

The thickness of the joint part is a length of the shortest side of the rectangular prism.

In FIG. 6, the joint part has a socket 605 for inserting a bottom end 6311 of the central column 631.

In some embodiments, the socket is non-circular to prevent rotation, as illustrated in FIG. 6, which has a non-complete circular shape for preventing undesired rotation.

In some embodiments, the socket is filled with elastic glue for providing a connection buffer between the bottom end of the central column and the joint part.

In some embodiments, a thermal adhesive glue is applied to the socket.

The thermal adhesive glue has a thermal conductivity between 0.8 W/m-K to 5 W/m-K.

In some embodiments, the joint part has asymmetric ridges at a connection portion between the central column and the joint part.

In FIG. 5, the extending bracket includes multiple metal support rods 6131.

An inner end of the support rod 6131 is embedded in the central column.

An external end 61312 of the support rod 6131 holds a portion of the flexible light strip 612.

In some embodiments, a diameter of the central column is smaller than ⅕ of the thickness of the joint part. The support rod may be an elongated cylinder or geometric polygonal cylinder, and its diameter is its cross section area maximum length.

In some embodiments, the lighting apparatus may also include a plurality of conductive terminals 641 spaced apart from each other.

The number of the conductive terminals 641 matches the number of the flexible light strips, e.g. two conductive terminals 641 for each flexible light strip.

A bottom end 6412 of each conductive terminal 641 passes through the base column 608 for an electrical connection of an Edison cap.

A top end 6411 of each conductive terminal 641 is coupled to the flexible light strip 612.

In some embodiments, the distance between the top ends of two adjacent conductive terminals is greater than 0.4 mm.

In some embodiments, the top end of each conductive terminal is provided with a bent connecting portion, as illustrated in FIG. 5.

The length direction of each bent connecting portion is arranged parallel to an axis of a support rod of the extending bracket, and the lengths of the plurality of bent connecting portions either sequentially increase or sequentially decrease along the axis of the support rod.

Figure 7:
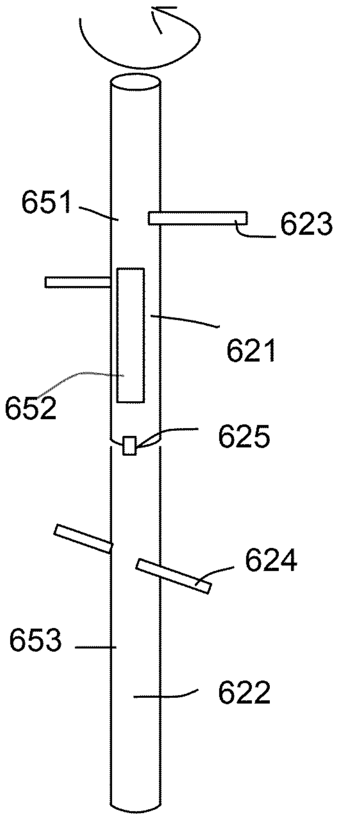
FIG. 7 shows a rotatable central column example.

In FIG. 7, the central column is a multi-stage rotational structure.

The multi-stage rotational structure may have several segments 621, 622 that may be rotated with each other, capable of rotating along an axis of the central column to expand and deploy the flexible light strip.

In some embodiments, a lock unit 625 locks a status of the multi-stage rotational structure when the multi-stage rotational structure is rooted to a predetermined position.

In some embodiments, a reflective layer 651 is disposed on the surface of the central column.

In some embodiments, a light source 652 is disposed to the central column 653.

In some embodiments, there are multiple LED modules disposed on the flexible light strip.

The LED modules on the flexible light strip near the base column are more sparsely arranged.

Figure 8:
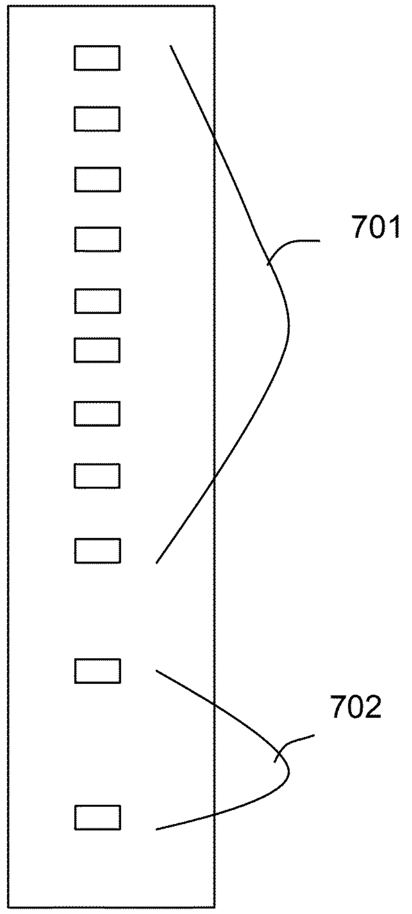
FIG. 8 shows LED distribution at different position of a flexible light strip.

In FIG. 8, the flexible light strip has different LED distribution. In the area 701 close to the top of a bulb shell, more LED modules are arranged in a density pattern while in the bottom area 702 closer to the base column, fewer LED modules are disposed. This is not only helpful for heat dissipation but also to provide a better light efficiency.

The purpose of this embodiment is to provide a filament lamp that aims to solve the technical problem of the stability of the central column's installation part affecting the service life of the lamp in existing technology.

This embodiment is implemented as follows: A filament lamp includes a main lamp body, a base column, a central column, and a flexible light strip. The base column and the central column are both set inside the main lamp body. The flexible light strip is set on the central column and electrically connected to the main lamp body. The first end of the base column is connected to the main lamp body, and a joint part is set on the second end of the base column. The end of the central column is inserted into the joint part. The ratio of the thickness of the joint part to the diameter of the base column is greater than or equal to 2:3.

In one optional embodiment, the central column and the base column are coaxially arranged, and the ratio of the thickness of the joint part to the diameter of the central column is greater than or equal to 5:1.

In one optional embodiment, the main lamp body includes a bulb shell and a lamp base assembly. The lamp base assembly is set at the opening of the bulb shell. The first end of the base column is connected to the lamp base assembly, and both the central column and the flexible light strip are set inside the bulb shell. The flexible light strip is electrically connected to the lamp base assembly.

In one optional embodiment, there are multiple flexible light strips, all arranged parallel to each other and in a double helix configuration.

In one optional embodiment, the filament lamp also includes multiple spaced conductive terminals. The number of conductive terminals matches the number of flexible light strips. The first end of each conductive terminal is connected to the lamp base assembly, and the second end passes through the base column and the joint part to connect with the flexible light strip.

In one optional embodiment, the second ends of the multiple conductive terminals are spaced apart from each other, and the distance between the second ends of adjacent conductive terminals is greater than 0.4 mm.

In one optional embodiment, the second end of each conductive terminal has a bent connection part. The length direction of each bent connection part is parallel to the axial direction of the central column, and the lengths of the multiple bent connection parts either gradually increase or decrease along the axial direction of the central column.

In one optional embodiment, multiple support connectors are also set on the central column, and the flexible light strips are all connected to the central column through these support connectors.

In one optional embodiment, the length of the joint part matches the diameter of the base column, and there is a transition structure between the base column and the joint part.

In one optional embodiment, the interior of the base column is hollow, with its first end open. A connection cover is set at the first end of the base column, encircling its perimeter. This connection cover is placed over the opening of the lamp base assembly.

The technical effect of this embodiment compared to existing technology is as follows: A central column is set inside the main lamp body to support the flexible light strip. A base column is set inside the main lamp body, with its first end connected to the main lamp body and a joint part set on its second end. The end of the central column is inserted into the joint part. The ratio of the thickness of the joint part to the diameter of the base column is greater than or equal to 2:3. Compared to existing filament lamps, setting this ratio to be greater than or equal to 2:3 increases the strength of the joint part while ensuring the overall lightness of the lamp. This also makes the installation of the central column more stable, making the lamp safer and more reliable, thus extending its service life.

Please refer to FIG. 1 to FIG. 4. In this embodiment of the embodiment, a filament lamp is provided, including a main lamp body 1, a base column 2, a central column 3, and a flexible light strip 5. The base column 2 and central column 3 are both set inside the main lamp body 1. The flexible light strip 5 is set on the central column 3 and electrically connected to the main lamp body 1. The first end of the base column 2 is connected to the main lamp body 1, and a joint part 4 is set on the second end of the base column 2. The end of the central column 3 is inserted into the joint part 4. The ratio of the thickness of the joint part 4 to the diameter of the base column 2 is greater than or equal to 2:3.

The main lamp body 1 refers to the main part of the lamp, including at least one conductive part for connecting the lamp to installation structures like lamp sockets, and at least one part that allows light to pass through. The flexible light strip 5 refers to the light-emitting component that converts electrical energy into light energy, usually composed of multiple LED beads arranged in a group. The flexible light strip 5 needs to be connected to the conductive part of the main lamp body 1 to emit light when connected to an external circuit.

The central column 3 refers to a rod-like component of a certain length. The base column 2 refers to a component of a certain length, which functions to fix the central column 3 while preventing it from contacting the lamp body.

The joint part 4 refers to a block-like component with a certain height, set along the axial direction of the base column 2. The joint part 4 is set at the second end of the base column 2 and can be made of glass material. When the joint part 4 is in a molten state, the end of the central column 3 is inserted into it. After the joint part 4 cools, the central column 3 is securely connected to the joint part 4. The thickness of the joint part 4 refers to its dimension in the direction indicated by arrow B in FIG. 2, and its cross-section refers to the plane perpendicular to the axis of the base column 2.

The filament lamp provided in this embodiment of the embodiment has a central column 3 set inside the main lamp body 1 to support the flexible light strip 5. A base column 2 is set inside the main lamp body 1, with its first end connected to the main lamp body 1 and a joint part 4 set on its second end. The end of the central column 3 is inserted into the joint part 4. The ratio of the thickness of the joint part 4 to the diameter of the base column 2 is greater than or equal to 2:3. Compared to existing filament lamps, setting this ratio to be greater than or equal to 2:3 increases the strength of the joint part 4 while ensuring the overall lightness of the lamp. This makes the installation of the central column 3 safer and more stable, making the lamp safer and more reliable, thus extending its service life.

Figure 2:
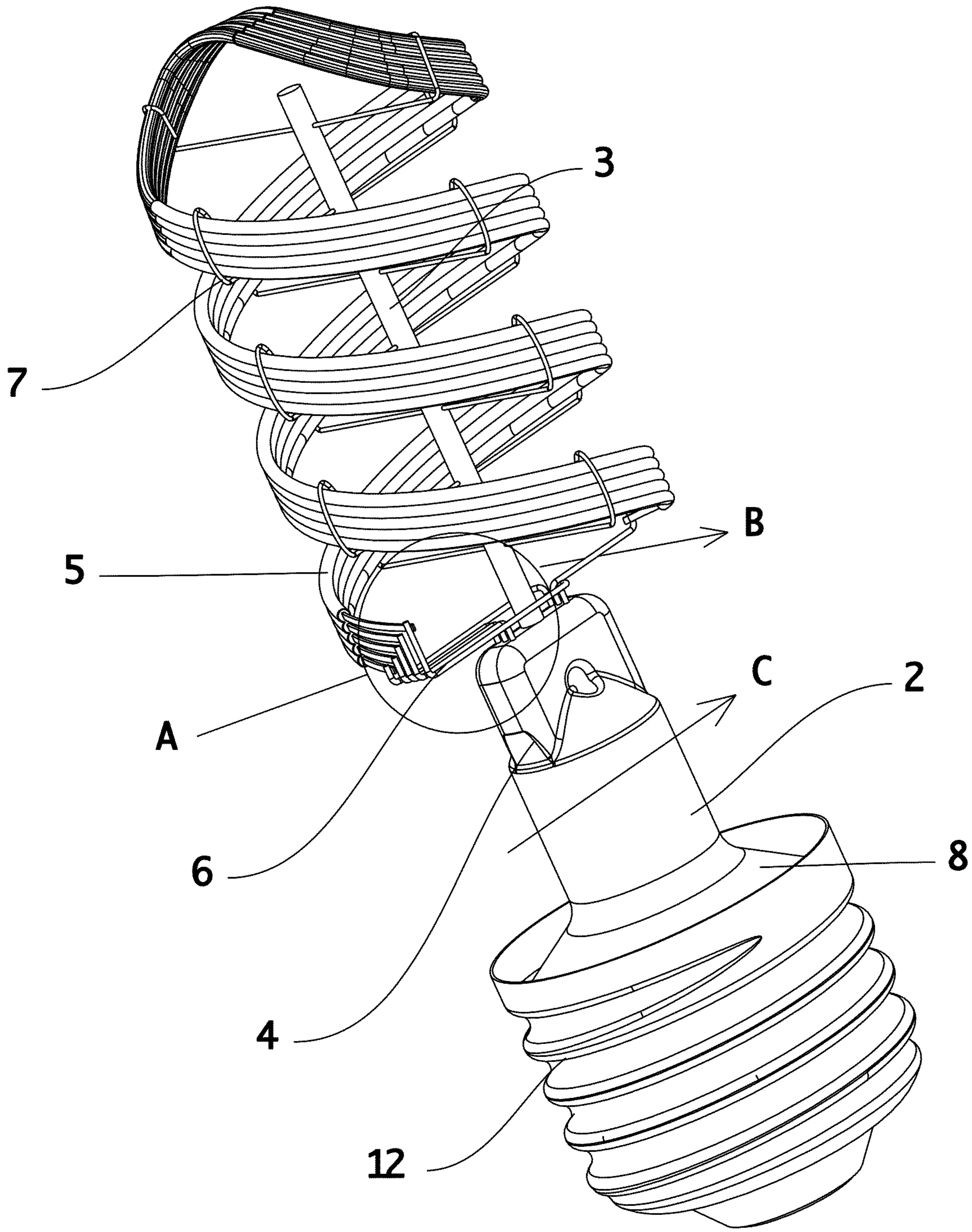
FIG. 2 illustrates a major component in the example of FIG. 1.
Figure 3:
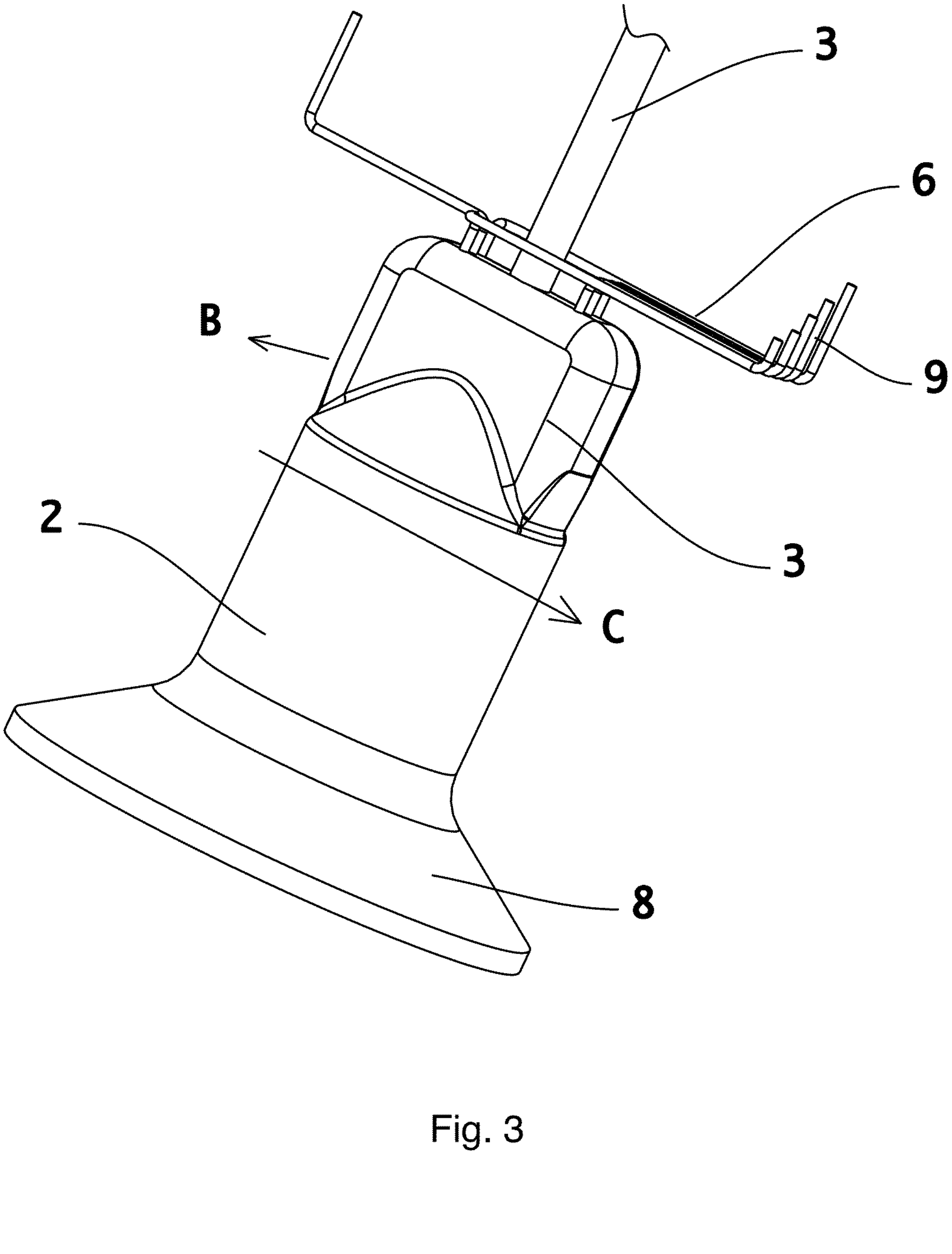
FIG. 3 illustrates a zoom-up view of a portion of the component in FIG. 2.
Figure 4:
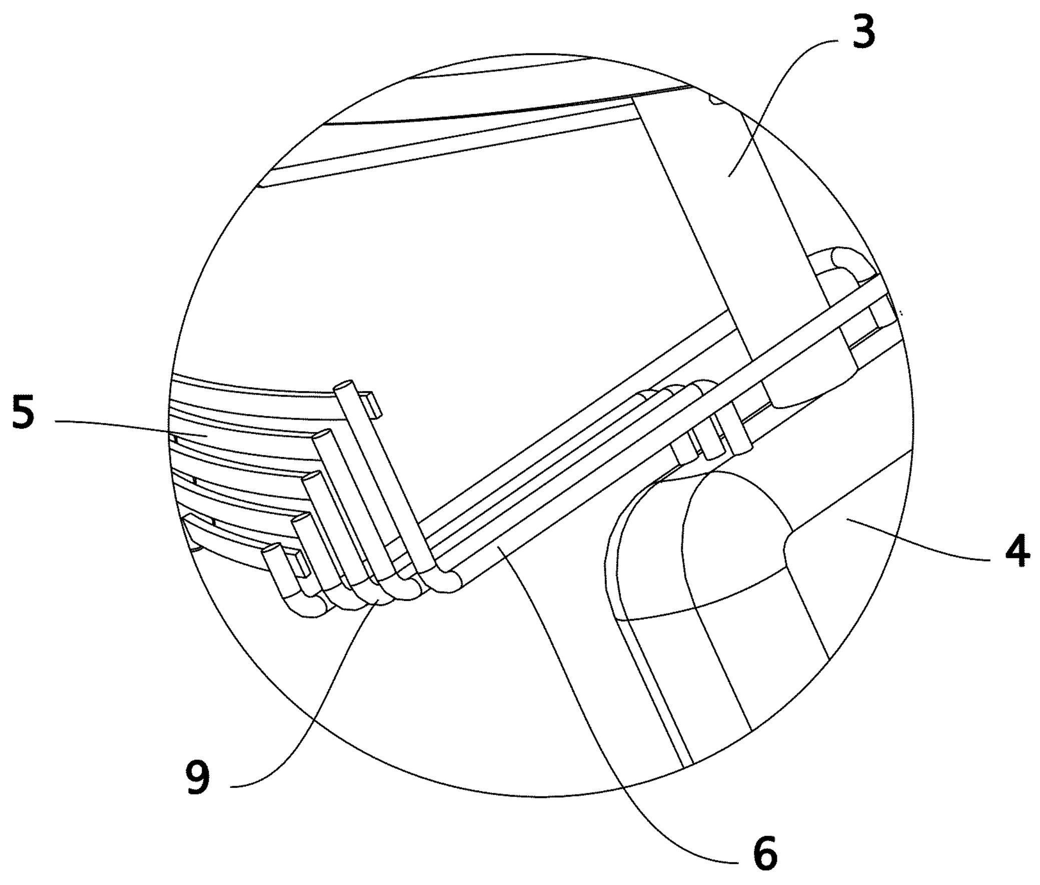
FIG. 4 illustrates a zoom-up view of conductive terminals.

In an optional embodiment, as shown in FIG. 2 and FIG. 3, the joint part 4 is overall cuboid-shaped, with its height dimension set along the axial direction of the base column 2, and its length dimension greater than its width dimension. The joint part 4 can be integrally formed with the base column 2, making their connection more secure.

In one embodiment, as shown in FIG. 2 and FIG. 3, the central column 3 and the base column 2 are coaxially arranged, and the ratio of the thickness of the joint part 4 to the diameter of the central column 3 is greater than or equal to 5:1. Specifically, to ensure the strength of the central column 3, its cross-section is generally circular. The diameter of the central column 3 refers to its dimension perpendicular to its axial direction. The outer contour of the base column 2's cross-section is also generally circular. The coaxial arrangement of the central column 3 and base column 2 ensures more uniform force distribution when the central column 3 is installed in the joint part 4. Meanwhile, the ratio of the thickness of the joint part 4 to the diameter of the central column 3 being greater than 5:1 ensures the strength of the central column 3 while avoiding a thin joint part 4 due to an oversized central column 3, making the installation more secure and reliable.

In an optional embodiment, the central column 3 is made of stainless steel. Specifically, using stainless steel for the central column 3 minimizes its weight while ensuring strength. Additionally, the stainless steel material prevents rusting, thus extending the lamp's lifespan.

Figure 1:
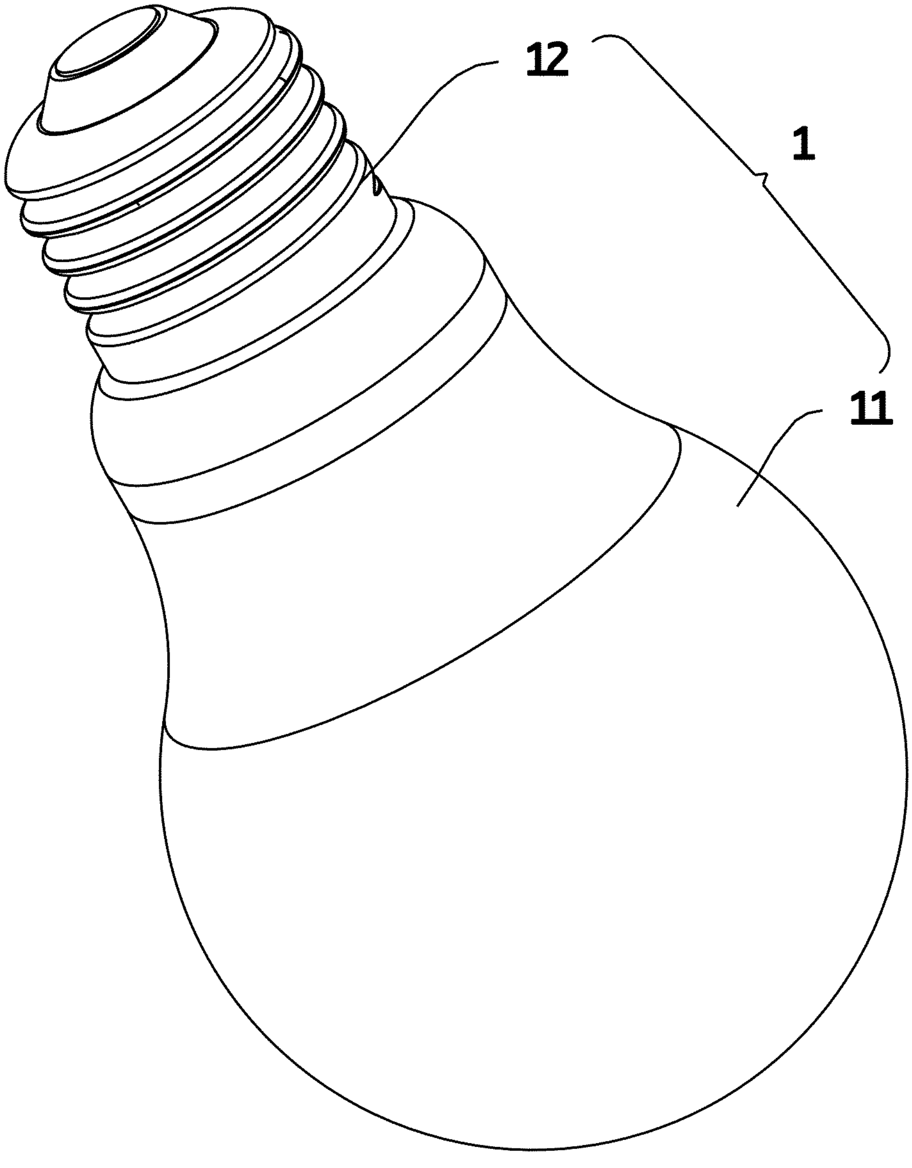
FIG. 1 illustrates a lighting apparatus embodiment.

In one embodiment, as shown in FIG. 1, the main lamp body 1 includes a bulb shell 11 and a lamp base assembly 12. The lamp base assembly 12 is set at the opening of the bulb shell 11. The first end of the base column 2 is connected to the lamp base assembly 12, while both the central column 3 and the flexible light strip 5 are set inside the bulb shell 11. The flexible light strip 5 is electrically connected to the lamp base assembly 12. Specifically, the bulb shell 11 is a thin-walled component that allows light to pass through. The lamp base assembly 12 may include a lamp base and conductive pins set on it. Dividing the main lamp body 1 into a bulb shell 11 and a lamp base assembly 12 facilitates easier production and assembly of the lamp.

In one embodiment, as shown in FIG. 2, there are multiple flexible light strips 5, all arranged parallel to each other and in a double helix configuration. Specifically, having multiple parallel flexible light strips 5 can increase the lamp's luminous flux. It also allows for different colors and/or color temperatures, enabling adjustment of the lamp's brightness or color temperature by illuminating different flexible light strips 5. Moreover, the double helix arrangement of the flexible light strips 5 allows for a more rational arrangement inside the bulb shell 11, improving space utilization.

In one embodiment, as shown in FIG. 2, the filament lamp also includes multiple spaced conductive terminals 6. The number of conductive terminals 6 matches the number of flexible light strips 5. The first end of each conductive terminal 6 is connected to the lamp base assembly 12, and the second end passes through the base column 2 and the joint part 4 to connect with the flexible light strip 5. Specifically, the conductive terminals 6 are conductive components of a certain length, such as metal nickel, gold, or copper with good conductivity. Connecting the flexible light strips 5 to the conductive parts of the lamp base assembly 12 via the conductive terminals 6 facilitates easier illumination of the flexible light strips 5. The spaced arrangement of multiple conductive terminals 6 reduces the risk of short circuits due to contact between them. The conductive terminals 6 passing through the base column 2 and joint part 4 are fixed when the joint part 4 is in a molten state and then solidifies as it cools, ensuring a more secure and reliable fixation of the conductive terminals 6.

In one embodiment, as shown in FIG. 2 and FIG. 3, the second ends of the multiple conductive terminals 6 are spaced apart from each other, with the distance between the second ends of adjacent conductive terminals 6 being greater than 0.4 mm. This spacing ensures that the conductive terminals 6 won't short-circuit while minimizing the space they occupy, improving space utilization inside the bulb shell 11 and making the lamp's internal structure more rational.

In one embodiment, as shown in FIG. 2 and FIG. 3, the second end of each conductive terminal 6 has a bent connection part. The length direction of each bent connection part is parallel to the axial direction of the central column 3, and the lengths of the multiple bent connection parts either gradually increase or decrease along the axial direction of the central column 3. Specifically, the bent connection part is formed by bending a section of the conductive terminal 6 and is an integral part of it. This design facilitates easier welding of the flexible light strip 5 to the conductive terminal 6. The parallel arrangement of the bent connection parts to the central column 3's axis makes the conductive terminals 6 more orderly. The gradual increase or decrease in length of the bent connection parts creates a staggered arrangement, providing more space for connections between the conductive terminals 6 and the flexible light strips 5.

In one embodiment, as shown in FIG. 2, multiple support connectors 7 are also set on the central column 3, and the flexible light strips 5 are all connected to the central column 3 through these support connectors 7. Specifically, the support connectors 7 are rigid components of a certain length that make the installation and fixation of the flexible light strips 5 more convenient. Moreover, by adjusting the length of the support connectors 7, the fixed position of the flexible light strips 5 can be adjusted, allowing them to be fixed in various shapes and making their fixation more flexible.

In an optional embodiment, as shown in FIG. 2, each support connector 7 includes a main body part and a support ring. Specifically, the main body parts are all set along the radial direction of the central column 3, with one end connected to the central column 3 and the support ring set on the other end. When fixing the flexible light strip 5, it can be threaded through the support ring, which provides support and positioning. The main body part connects the support ring to the central column 3, making the installation and fixation of the flexible light strips 5 more convenient and the internal structure of the lamp more rational.

In one embodiment, as shown in FIG. 3, the length of the joint part 4 matches the diameter of the base column 2, and there is a transition structure between the base column 2 and the joint part 4. Specifically, the length of the joint part 4 refers to its maximum dimension in the cross-section perpendicular to the axis of the base column 2, as indicated by arrow C in FIG. 2. By matching the length of the joint part 4 with the diameter of the base column 2, the two sides of the joint part 4 along its length are flush with the outer wall of the base column 2, improving the overall strength of the joint part 4. The transition structure between the base column 2 and the joint part 4 is a filling structure that fills the gap between them, making their connection more secure and the transition smoother.

In one embodiment, as shown in FIG. 3, the interior of the base column 2 is hollow, with its first end open. A connection cover 8 is set at the first end of the base column 2, encircling its perimeter. This connection cover 8 is placed over the opening of the lamp base assembly 12. Specifically, the hollow interior of the base column 2 makes it lighter while maintaining its strength. The connection cover 8 at the first end of the base column 2 is sized to fit the opening of the lamp base assembly 12. When connecting the base column 2 to the lamp base assembly 12, the connection cover 8 can be fitted over the opening of the lamp base assembly 12, making the connection more convenient and secure while also improving the internal sealing of the lamp.

Furthermore, the hollow interior of the base column 2 provides space for the conductive terminals 6 to pass through, making it more convenient for the conductive terminals 6 to pass through the base column 2 and resulting in a more rational internal structure layout for the entire lamp.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a flexible light strip, wherein the flexible light strip is bendable along a longitudinal axis of the flexible light strip to conform to various curvatures;

a base column;

a central column;

an extending bracket, wherein a first end of the extending bracket is fixed on the central column and a second end of the extending bracket engages the flexible light strip to conform to a required varying curvatures of the light strip;

a joint part for coupling the base column and the central column, wherein a thickness of the joint part is larger than ⅔ of a diameter of the central column; and a plurality of conductive terminals spaced apart from each other, wherein the number of the conductive terminals matches the number of the flexible light strips, wherein a bottom end of each conductive terminal passes through the base column for an electrical connection of an Edison cap, wherein a top end of each conductive terminal is coupled to the flexible light strip.

2. The lighting apparatus of claim 1, wherein the central column and the base column are made of glass material.

3. The lighting apparatus of claim 1, further comprising an Edison cap, a holder, a bulb shell and a driver, wherein the Edison cap is used for guiding an external AC power to the drive module for generating a driving current to the flexible light strip, wherein the Edison cap is attached to a bottom end of the holder, wherein the bulb shell is attached to a top end of the holder, wherein the base column is fixed to the top end of the holder.

4. The lighting apparatus of claim 1, wherein the joint part and the base column are integrally molded glass parts, seamlessly fused during a molding process.

5. The lighting apparatus of claim 4, wherein the joint part has a shape of a rectangular prism, wherein the thickness of the joint part is a length of a shortest side of the rectangular prism.

6. The lighting apparatus of claim 4, wherein the joint part has an socket for inserting a bottom end of the central column.

7. The lighting apparatus of claim 6, wherein the socket is non-circular to prevent rotation.

8. The lighting apparatus of claim 6, wherein the socket is filled with elastic glue for providing a connection buffer between the bottom end of the central column and the joint part.

9. The lighting apparatus of claim 6, wherein a thermal adhesive glue is applied to the socket, wherein the thermal adhesive glue has a thermal conductivity between 0.8 W/m-K to 5 W/m-K.

10. The lighting apparatus of claim 6, wherein the joint part has asymmetric ridges at a connection portion between the central column and the joint part.

11. The lighting apparatus of claim 1, wherein the extending bracket comprises multiple metal support rods, wherein an inner end of the support rod is embedded in the central column, wherein an external end of the support rod holds a portion of the flexible light strip.

12. The lighting apparatus of claim 11, wherein a diameter of the central column is smaller than ⅕ of the thickness of the joint part.

13. The lighting apparatus of claim 1, wherein the distance between the top ends of two adjacent conductive terminals is greater than 0.4 mm.

14. The lighting apparatus of claim 1, wherein the top end of each conductive terminal is provided with a bent connecting portion, wherein the length direction of each bent connecting portion is arranged parallel to an axis of a support rod of the extending bracket, and the lengths of the plurality of bent connecting portions either sequentially increase or sequentially decrease along the axis of the support rod.

15. The lighting apparatus of claim 1, wherein the central column is a multi-stage rotational structure, wherein the multi-stage rotational structure is capable of rotating along an axis of the central column to expand and deploy the flexible light strip.

16. The lighting apparatus of claim 15, wherein a lock unit locks a status of the multi-stage rotational structure when the multi-stage rotational structure is rooted to a predetermined position.

17. The lighting apparatus of claim 15, wherein a reflective layer is disposed on the surface of the central column.

18. The lighting apparatus of claim 1, wherein a light source is disposed to the central column.

19. The lighting apparatus of claim 1, wherein there are multiple LED modules disposed on the flexible light strip, wherein the LED modules on the flexible light strip near the base column are more sparsely arranged.

* * * * *